United States Patent [19]
Suhr

[11] Patent Number: 5,435,663
[45] Date of Patent: Jul. 25, 1995

[54] ROAD MARKING

[75] Inventor: Jörn Suhr, Nättraby, Sweden

[73] Assignee: Cleanosol International AB, Sweden

[21] Appl. No.: 295,697

[22] PCT Filed: Feb. 24, 1993

[86] PCT No.: PCT/SE93/00149

§ 371 Date: Aug. 25, 1994

§ 102(e) Date: Aug. 25, 1994

[87] PCT Pub. No.: WO 93/18237

PCT Pub. Date: Sep. 16, 1993

[30] Foreign Application Priority Data

Mar. 3, 1992 [SE] Sweden .................................. 9200635

[51] Int. Cl.⁶ .................................................. E01F 9/00
[52] U.S. Cl. ........................................................ 404/14
[58] Field of Search .................................. 404/12–14, 404/4, 10, 16

[56] References Cited

U.S. PATENT DOCUMENTS

| | | | |
|---|---|---|---|
| 4,751,140 | 6/1988 | Ishihara | 404/14 X |
| 5,380,549 | 1/1995 | Harvison | 404/14 X |

FOREIGN PATENT DOCUMENTS

| | | |
|---|---|---|
| 0466671 | 1/1992 | European Pat. Off. . |
| 2205710 | 8/1978 | Germany . |
| 5665665 | 5/1988 | Switzerland . |

*Primary Examiner*—Michael Powell Buiz
*Attorney, Agent, or Firm*—Lerner, David, Littenberg, Krumholz & Mentlik

[57] ABSTRACT

A marking for the creation of a luminant surface on a substrate (10) which surface is intended to be used as direction-, wearing- and/or side markings on roads, streets, quays or parking places and which surface is subjected to water and tire wearing from passing vehicles. The marking comprises a binder (11) which fluoresces by irradiation with UV-A-light. The surface of the marking have light permeable glass pearls (12) having a size of between 0.4 and 1.0 millimeter which are embedded to about 50 and 75% of their size in the binder (11).

3 Claims, 1 Drawing Sheet

ROAD MARKING

FIELD OF THE INVENTION

The present invention relates to a marking for the creation of a luminescent surface of a substrate which-surface is intended to be used as a marking for directions, warning and/or side marking of roads, streets, quays or parking areas and which surface is subjected to water and tire wearing from passing vehicles which marking comprises a binder which is fluorescing when being irradiated by UV-A-light.

PRIOR ART

The use of glass pearls in and on road markings as reflecting pearls is since long commonly known and is prescribed also by authorities in several countries.

The object of the glass pearls is to re-reflect incoming light from vehicles to the driver of the vehicle during darkness and thereby increase the visibility of the road markings. The function is commonly known as retro-reflection.

The glass pearls fulfils their task during darkness when they are activated by the headlights or dipped headlights of vehicles. The distance of visibility at dipped headlights is however less than half of the corresponding distance for full headlights.

At rain or when the coating with the glass pearls for other reasons are covered with a water film, the incoming light is mirrored away from the vehicle and the vehicle driver so that the marking at the best only is visible a few meter ahead of the vehicle.

In fog the visible light of the vehicle is reflected by the small water drops of which the fog consists and the visible distance of the vehicle driver is often reduced to less than 20 meters, which is almost the same as the reaction distance at a speed of 70 km/h before the driver can start braking. The same occurs also when snowing. The difference is only that it is snowflakes which reflect the light of the vehicle and prevents that it gets its full distance.

To improve the distance of visibility one has tried to equip the vehicles with lamps that emits ultra violet light within the wave length of 320–400 nm, whereby the fluorescing coatings is influenced by the ultra violet light and emits visible light within the area of wave length of 400 nm.

As the ultra violet light is not mirrored away by a water film or re-reflected back by fog or snowflakes the fluorescing coating is activated by the ultra violet light, also under a water film and through fog and snowing and emits visible light which makes the coating visible for the driver also when it is covered by a water film, fog or snowflakes.

The emitted visible light is sent out from the fluorescing coating in all directions and is called a diffuse light, contrary to the light from the vehicle which is reflected back to the vehicle driver from the reflection pearls or reflected away from the vehicle by a water mirror.

The ultra violet light is invisible for meeting vehicle drivers and has therefore no blinding effect. With suitable UV beam lights it is therefore theoretically possible to bring about the same distance of visibility as using complete head lights without blinding meeting vehicle drivers.

In practice, however, the fluorescence effect has shown to be very short-lived.

In several patents proposals for improved fluorescing coatings have been made, for example U.S. Pat. No. 3,253,146, SE, B, 462 109 and GB, A, 2 043 673. The first mentioned publication proposes use of glass pearls which have been covered with fluorescing pigment particles. SE, B, 462 109 proposes the use of crushed rock material and a mineral which melts and have been doped with an agent that gives the mineral fluorescing properties.

Another variation of a fluorescent coating is described in EP 466 671. The coating disclosed therein contains doped glass pearls which fluoresce when being illuminated with ultra violet light. The pearls can be clear or pigmented. The light emitted from these pearls is however weak and can be seen from at most 50 meter, which is far too less when the coating is used for vehicle traffic.

The attempts to increase the intensity of the fluorescence or the emitted light by increasing the strength of the UV-lamps or the intensity of absorption of the fluorescing coating have not in any decisive way increased the practical visibility for fluorescing coatings.

None of the proposed solutions give accordingly sufficient fluorescing effect to bring about a practical solution of the above said problem.

TECHNICAL PROBLEM

An object with the present invention is therefore to bring about a road marking which fulfils the desire of improved visibility in darkness, rain, fog and snowing.

THE SOLUTION

This object is solved according to the invention by bringing about a marking for the creation of a luminant surface on a substrate (10) which surface is intended to be used as direction-, wearing-, and/or side markings of roads, streets, quays or parking places and which surface is subjected to water and tire wearing from passing vehicles which marking comprises a binder (11) which fluoresces by irradiation with UV-A-light and light permeable glass pearls which are embedded to between 50 and 76% of their size in the binder, which is characterized in that the glass pearls have a size of between 0.4 and 100 millimeter and a spreading within the area size of at most 0.1 millimeter and an iron oxide content below 0.1%.

According to the invention the glass pearls should have a size of about 0.6–1.0 millimeters and they should have a refraction index of between 1.45 and 1.60.

By using glass pearls and a binder according to the present invention one creates a coating having small lamps being the glass pearls when illuminated with UV-A-light. These lamps or coating are emitting very strong light and can be seen from a distance of at least 150 meter. The reason for this is that the glass pearls have a very small size distribution, they have a very small content of iron oxide so that the pearls shall not reflect the light coming in but absorb the UV-B-light which is not wanted.

FIGURE DESCRIPTION

One embodiment example of the invention will now be described more in detail in connection with the attached drawings in which FIG. 1 shows a marking according to conventional technique and how it works under retro-reflection by light, FIG. 2 shows the corresponding marking after some times wearing of tire spikes and how these wearing influences the retro-reflection, FIG. 3 again shows a corresponding marking, but now with a water layer and how this layer influences the retro-reflection, FIG. 4 shows a marking according to the invention and how this works when being irradiated with UV-light, FIG. 5 shows the corresponding marking after wearing for some time by tire spikes and how these wearing influences the ability of the marking to send out visible light as an answer to the UV-irradiation and FIG. 6 again shows a corresponding marking, now with a water layer and how this layer does not take away the ability of the marking to send out visible light as an answer to the UV-irradiation.

PREFERRED EMBODIMENTS

The FIGS. 1–3 shows a conventional road marking which has been made on a surface 10 and comprises a binder 11 which has been coloured with usual pigments, for example white or yellow. In each of the figures a glass pearl 12 is shown being embedded to some more than half the diameter of the pearl. Usually there are further not shown pearls mixed in the binder which will only appear after the road marking has been subjected to some wearing.

In FIG. 1 irradiation by visible light in the glass pearl 12 is shown by continuous arrows 13, which light is emitted by a vehicles head lights having an angle of about 2° to the marking. The light rays is refracted by the convex glass body 12 in toward a concentrated point 14 which is in contact with the binder 11. Hereby light from the point 14 is re-reflected which is visualized by broken lines 15, at least parallel in a direction to the driver of the vehicle.

Figure 1:
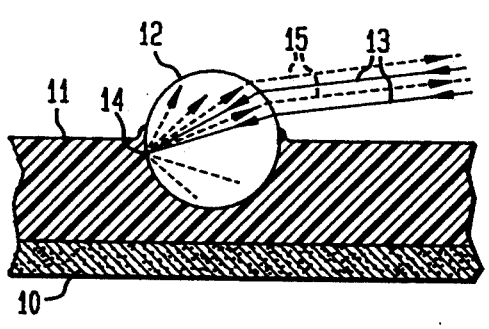
Figure 4:
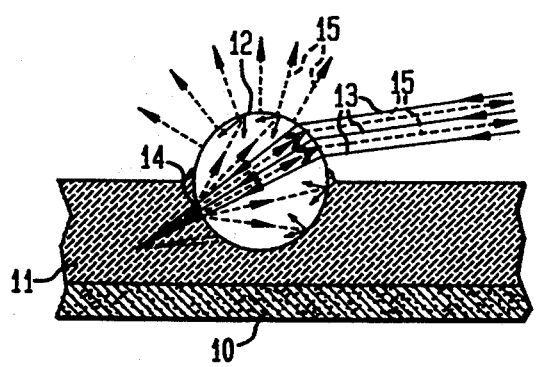
Figure 2:
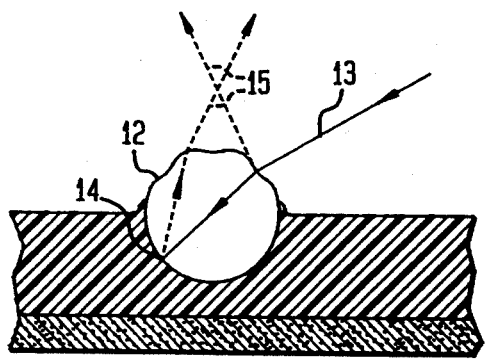
FIG. 2 shows how this retro-reflection is deteriorated by a glass pearl 12 which has been subjected to wearing, for instance by tire spikes. Hereby the uneven glass surface will spread and mirror away the visible light so that the retro-reflection will be negligible.

FIG. 4 shows how a marking according to the invention works when being irradiated by UV-A-light in the glass pearl 12. The binder 11 surrounding the lower part of the pearl is of a type which fluoresces when being irradiated with UV-A-light. The light rays coming from a vehicle having UV-A head lights will be refracted by the convex glass body 12 to a diffuse point 14 which is in contact with the binder 11. Hereby the irradiated binder point 14 will fluoresce and send out visible light which is spread in all directions and reflected by the concave binder surface in which the pearl is embedded which is visualized by broken lines 15.

The ultra violet light sent out from a vehicle having UV head lights hits the marking according to the invention and is refracted at the entrance of the glass pearl so that it irradiates a point of the fluorescing binder which surrounds the embedded part of the glass pearl and results in a visible light which is sent out from the point to the further surface of the glass pearl which is partly surrounded by air and partly by coating.

As the surrounding air is an optically thinner medium, a total reflection on this part of the pearl is obtained so that it will be visible as an intensively lighting lamp from the position of the vehicle driver.

The effect herefrom is surprising as meeting vehicle driver will see the lighting glass pearls also in such a case where this vehicle has not been equipped with UV head light.

Figure 5:
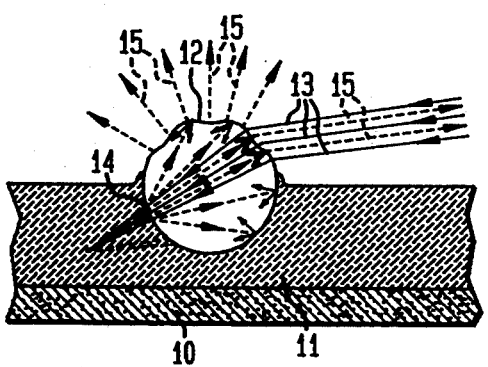
Figure 3:
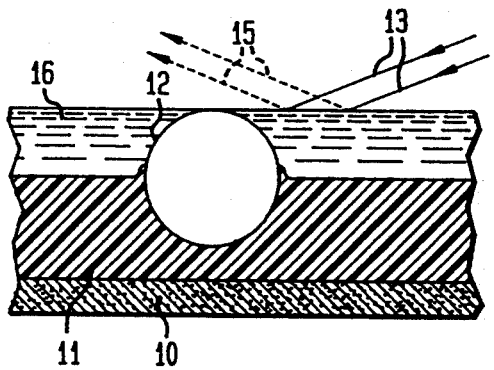
FIG. 3 shows finally how visible light is mirrored away from a vehicle when the road is covered by a water layer 16. The marking is in this case practically invisible for the driver.

An even glass pearl according to FIG. 5 will spread the incoming UV-light so that a major part of the concave surface of the binder will be irradiated by a less intensive light. A worn marking by tire spikes according to the invention will still be activated by irradiation with UV-light but the glass pearls will light less intensively.

Figure 6:
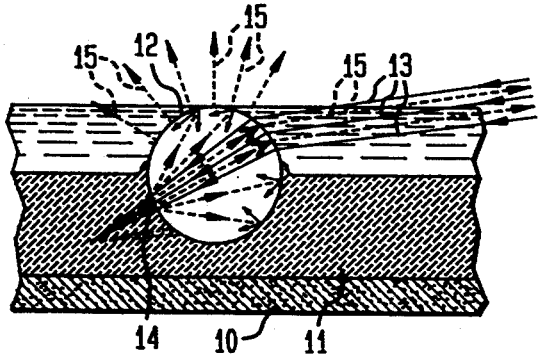

If the marking according to the present invention is covered by a water layer according to FIG. 6 UV-light coming from a vehicle will penetrate through the water layer and activate the fluorescing marking. The effect will be that the focusing of the irradiation which the glass body 12 brings about will result in that the water layer immediately above every glass pearl will light up.

Through the ability of the glass to let through or absorb ultra violet light of different wave length in different amounts depending on the composition of the glass, the ultra violet light can be regulated in amount and wave length, so that the fluorescing coating will obtain the maximal fluorescence at the same time as it is protected from such ultra violet irradiation, for example sun light that can bring about its too early destruction.

The marking according to the present invention does accordingly solve the problems to increase the visibility of the fluorescing coatings by increasing the light volume and extend the time of function for the fluorescing coatings by protecting them against such UV irradiation which can bring about too early destruction of the fluorescing coating.

Iron oxide $Fe_2O_3$ absorbs ultra violet light in the wave length range immediately under and immediately above 400 nm. By regulating the amount of iron oxide in the glass pearls the amount of ultra violet light which is let through the pearl 12 to the cavity of binder which surrounds the pearl is controlled. Preferred amounts of iron oxide is 0–0.1%

Suitable properties can be found in technical glasses having an iron oxide content below 0.1%. Such a preferred glass lets 90% of the ultra violet light pass through which has a wave length of 375 nm. It does not let through ultra violet light of the type UV-B and UV-C.

Glass having a refraction index of 1.45 to 1.60 is preferred. Incoming irradiation is then focused outside a spherical glass pearl and gives therethrough the ultra violet lightning a possibility to obtain a larger surface of the under laying and surrounding fluorescent coating, at the same time as the glass pearl still functions as a glass pearl for visible light.

The above refraction index has been determined according to standard method to 587.9 nm. At the preferred wave length 375 nm for the ultra violet light the value for the refraction index is increasing. This brings about that the ultra violet light beam is refracted also at a very small angle of incidents at the entrance into the glass pearl so that it hits the fluorescing coating which surrounds the part of the glass pearl which is embedded in the coating.

Glass pearls according to the above description is preferred in a size of 0.4–0.8 mm and with a graduation which does not exceed ±0.1 mm. If the size of 0.7 mm is chosen all pearls shall fall within the size of 0.6–0.8 mm.

By a size of 1 mm about 100 glass pearls per $cm^2$ is required to give a mono layer having a suitable density. The weight of these glass pearls will be about 1.3 kilo/$m^2$.

At a size of 0.7 mm about 204 glass pearls per $cm^2$ will be required to give a mono layer having a suitable density. The weight of these glass pearls will be about 0.9 kg/$m^2$.

At a size of about 0.4 mm about 625 glass pearls per $cm^2$ will be required to give a monolayer having a suitable density. The weight of these glass pearls will be about 0.5 kg/$m^2$ The fluorescence effect will be decreased by small glass pearls due to the difficulty of arranging them in an even layer. At sizes between 0.4 and 0.8 mm the greatest number of glass pearls in function per $cm^2$ will be obtained and hence the largest volume of emitted light. By decreasing the number of glass pearls per $cm^2$ to the half also the light volume will decrease to the half in spite of the surface being completely covered by glass pearls in both cases.

In reflecting road markings of a thermoplastic type usually 20 weight percent reflexing pearls will be included and after the marking has been made on the road the strewing with further glass pearls before the coating has solidified occurs so that about 60% of the pearls are embedded in the coating. The amount of glass pearls for strewing is about 0.5 kg/$m^2$.

A preferred amount of glass pearls according to the invention to be mixed is about 20 weight percent but the invention is not limited to this mixture range.

A preferred amount of glass pearls according to the invention to be strewed is 0.9 kg/$m^2$ but the invention is not limited to this amount.

The strewing of the pearls can suitably be made immediately after the application of the coating on the substrate, that is at most 20–30 seconds after said application. The application is carried out by means of an air-pressure-driven pearl strewer which is provided with a mouth piece. The mouth piece is directed primarily perpendicularly towards the coating surface and is maintained at a distance of about 5–15 cm therefrom.

The invention is not limited to the above described embodiment example but several variants are thinkable within the scope of the following patent claims.

I claim:

1. Marking for the creation of a luminant surface on a substrate (10) which surface is intended to be used as direction-, wearing-, and/or side markings of roads, streets, quays or parking places and which surface is subjected to water and tire wearing from passing vehicles which marking comprises a binder 11 which fluoresces by irradiation with UV-A-light and light permeable glass pearls which are embedded to between 50 and 75% of their size in the binder, characterized in that the glass pearls (12) have a size of between 0.4 and 1.0 millimeter and a spreading within the area size of at most 0.1 millimeter and an iron oxide content below 0.1%.

2. Marking according to claim 1, characterized in that the glass pearls have a size of about 0.6 to 1.0 millimeters.

3. Marking according to claim 1 or 2, characterized in that the glass pearls (12) have a refraction index of between 1.45 and 1.60.

* * * * *

UNITED STATES PATENT AND TRADEMARK OFFICE
CERTIFICATE OF CORRECTION

PATENT NO.    : 5,435,663
DATED         : July 25, 1995
INVENTOR(S)   : Jörn Suhr It is certified that error appears in the above-identified patent and that said Letters Patent is hereby corrected as shown below:

Column 2, line 45, delete "100" and insert therefor --1.0--.

Signed and Sealed this

Seventeenth Day of October, 1995

Attest:

BRUCE LEHMAN

Attesting Officer          Commissioner of Patents and Trademarks